United States Patent
Shi et al.

(10) Patent No.: US 12,262,424 B2
(45) Date of Patent: Mar. 25, 2025

(54) HANDLING OF WIRELESS DEVICE SUBSCRIBED AGGREGATE MAXIMUM BITRATE (AMBR) IN WIRELESS COMMUNICATION NETWORKSAGGREGATE MAXIMUM BITRATE (AMBR) IN WIRELESS COMMUNICATION NETWORKS

(71) Applicant: TELEFONAKTIEBOLAGET LM ERICSSON (PUBL), Stockholm (SE)

(72) Inventors: Nianshan Shi, Järfälla (SE); Stefan Granlund, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/429,746

(22) PCT Filed: Feb. 13, 2020

(86) PCT No.: PCT/IB2020/051199
§ 371 (c)(1),
(2) Date: Aug. 10, 2021

(87) PCT Pub. No.: WO2020/165829
PCT Pub. Date: Aug. 20, 2020

(65) Prior Publication Data
US 2022/0104286 A1 Mar. 31, 2022

Related U.S. Application Data

(60) Provisional application No. 62/804,866, filed on Feb. 13, 2019.

(51) Int. Cl.
*H04W 76/10* (2018.01)

(52) U.S. Cl.
CPC .................................. *H04W 76/10* (2018.02)

(58) Field of Classification Search
CPC ....... H04W 8/24; H04W 76/12; H04W 88/08; H04W 88/14; H04W 76/10
See application file for complete search history.

(56) References Cited

U.S. PATENT DOCUMENTS

| 9,877,261 B2 | 1/2018 | Panaitopol |
| 10,869,324 B2 * | 12/2020 | Dai ................... H04W 28/0252 |

(Continued)

FOREIGN PATENT DOCUMENTS

| CN | 103125142 A | 5/2013 |
| CN | 108811000 A | 11/2018 |

(Continued)

OTHER PUBLICATIONS

3GPP "3rd Generation Partnership Project; Technical Specification Group Radio Access Network; NG-RAN; NG Application Protocol (NGAP) (Release 15)", TS 38.413 V15.2.0, Dec. 2015.

(Continued)

*Primary Examiner* — Hassan A Phillips
*Assistant Examiner* — Prenell P Jones
(74) *Attorney, Agent, or Firm* — Withrow & Terranova, PLLC

(57) ABSTRACT

Methods are provided in which a first network node sends a context setup request message to a second network node, the context setup request message not comprising a wireless device (WD) aggregate maximum bit rate (AMBR) value associated with a wireless device, determines that it has not previously provided the WD AMBR value to the second network node in the context setup request message, and then sends a resource setup request message to the second network node, the resource setup request message comprising the WD AMBR value associated with the wireless device. Related network nodes and computer program products are also provided.

17 Claims, 12 Drawing Sheets

(56) References Cited

U.S. PATENT DOCUMENTS

| | | | | |
|---|---|---|---|---|
| 2011/0116478 | A1* | 5/2011 | Zhang | H04W 36/0055 370/331 |
| 2011/0138066 | A1 | 6/2011 | Kopplin | |
| 2014/0169299 | A1* | 6/2014 | Wang | H04L 5/0096 370/329 |
| 2017/0006503 | A1 | 1/2017 | Panaitopol et al. | |
| 2018/0249373 | A1* | 8/2018 | Castro Castro | H04W 24/08 |
| 2018/0295659 | A1* | 10/2018 | Shan | H04W 4/24 |
| 2019/0124572 | A1* | 4/2019 | Park | H04W 80/10 |
| 2019/0246328 | A1* | 8/2019 | Qiao | H04W 36/30 |
| 2019/0297634 | A1* | 9/2019 | Dai | H04W 72/12 |
| 2019/0306754 | A1* | 10/2019 | Shan | H04W 8/06 |
| 2019/0313319 | A1* | 10/2019 | Qiao | H04W 4/90 |
| 2019/0335366 | A1* | 10/2019 | Jin | H04W 36/0033 |
| 2019/0335532 | A1* | 10/2019 | Kim | H04W 72/02 |
| 2020/0084663 | A1* | 3/2020 | Park | H04W 76/27 |
| 2021/0120450 | A1* | 4/2021 | Peng | H04W 28/22 |
| 2021/0204194 | A1* | 7/2021 | Cao | H04W 36/00835 |
| 2022/0022122 | A1* | 1/2022 | Cao | H04W 40/36 |

FOREIGN PATENT DOCUMENTS

| | | |
|---|---|---|
| KR | 20150035142 A | 4/2015 |
| RU | 2518186 C2 | 6/2014 |
| RU | 2628316 C2 | 8/2017 |

OTHER PUBLICATIONS

3GPP, 3rd Generation Partnership Project; Technical Specification Group Services and System Aspects; System Architecture for the 5G System; Stage 2 (Release 15), TS 23.501 V15.4.0, Dec. 2018.

3GPP, "3rd Generation Partnership Project; Technical Specification Group Radio Access Network; NR; NR and NG-RAN Overall Description; Stage 2 (Release 15)", TS 38.300 V15.4.0, Dec. 2018.

3GPP, "3rd Generation Partnership Project; Technical Specification Group Radio Access Network; NG-RAN; Architecture description (Release 15)", TS 38.401 V15.4.0, Dec. 2018. https://www.3gpp.org/ftp/Specs/archive/38_series/38.401.

3GPP, "3rd Generation Partnership Project; Technical Specification Group Radio Access Network; NG-RAN; F1 application protocol (F1AP) (Release 15)" TS 38.473 V15.4.1, Jan. 2019.

3GPP, 3rd Generation Partnership Project; Technical Specification Group Services and System Aspects; Procedures for the 5G System; Stage 2 (Release 15), TS 23.502 V15.4.1, Jan. 2019. https://www.3gpp.org/ftp/Specs/archive/23_series/23.502/.

Ericsson, "Correction on UE AMBR on F1AP", 3GPP TSG-RAN WG3 NR Meeting #101bis, R3-185919, Chengdu, P.R. China, Oct. 8-12, 2018.

Ericsson, "Correction on UE AMBR", 3GPP TSG-RAN WG3 Meeting #101 bis, R3-185916, Chengdu, P.R. China, Oct. 8 -12, 2018.

International Search Report and Written Opinion issued on corresponding PCT International Application PCT/IB2020/051199.

"5G NSA for MME" https://www.cisco.com/c/en/us/td/docs/wireless/asr_5000/21-11_6-5/5G-NSA-Solution/21-11-5G-NSA-Solution-Guide/21-11-5G-NSA-Solution-Guide_chapter_010.pdf.

Indian First Examination Report issued on Applicant's corresponding Application No. 202147040679 on Mar. 16, 2022.

Russian Office Action with Search Report issued on Applicant's corresponding Application No. 2021121298 on Jan. 25, 2022.

First Office Action for Chinese Patent Application No. 202080014334.8, mailed Nov. 30, 2023, 9 pages.

* cited by examiner

HANDLING OF WIRELESS DEVICE SUBSCRIBED AGGREGATE MAXIMUM BITRATE (AMBR) IN WIRELESS COMMUNICATION NETWORKSAGGREGATE MAXIMUM BITRATE (AMBR) IN WIRELESS COMMUNICATION NETWORKS

RELATED APPLICATIONS

The present application claims the benefits of priority of U.S. Provisional Patent Application No. 62/804,866; entitled "HANDLING OF WIRELESS DEVICE SUBSCRIBED AGGREGATE MAXIMUM BITRATE (AMBR) IN WIRELESS COMMUNICATION NETWORKS"; and filed at the United States Patent and Trademark Office on Feb. 13, 2019; the content of which is incorporated herein by reference.

TECHNICAL FIELD

The present description generally relates to wireless communications and wireless communication networks, and more particularly relates to the handling of aggregate maximum bit rate values in wireless communication networks.

BACKGROUND

The 5G system consists of 5G core network (also referred to as 5GC) nodes and 5G radio access network (also referred to as Next-Generation Radio Access Network (NG-RAN)) nodes. The 5G system defines the association between the User Equipment (UE) and a Data Network that provides a packet data unit (PDU) connectivity service as a PDU session. The new quality-of-service (QoS) framework is currently being standardized. The 5G QoS model is based on QoS flows. The PDU sessions comprise one or more QoS flows. FIG. 1 shows the QoS flow and PDU session architecture (see also section 12.1 of 3GPP TS 38.300 V15.4.0).

Each UE (or wireless device) is associated with a UE Aggregate Maximum Bit Rate (UE AMBR). The UE AMBR limits the aggregate bit rate that can be expected to be provided across all Non-GBR QoS flows of a UE. The NG-RAN node (i.e., a 5G radio network node) is expected to set its UE AMBR to the sum of the PDU session AMBR of all PDU sessions with active user plane to this NG-RAN node up to the value of the subscribed UE AMBR. The subscribed UE AMBR is a subscription parameter which is retrieved from the Unified Data Management (UDM) and provided to the NG-RAN node by the Access and Mobility Management Function (AMF).

SUMMARY

In current standard specifications, there is a procedure to provide the subscribed UE AMBR from the AMF to the NG-RAN node. This procedure is called "Initial Context Setup." In this procedure, which is illustrated in FIG. 2, the "UE Aggregate Maximum Bit Rate" information element (IE), which is the subscribed UE AMBR, is sent to the NG-RAN node as a conditional IE, that is as an IE which is present when a certain condition is met. As per section 9.2.2.1 of 3GPP TS 38.413 V15.2.0, the condition to be met is the presence of the PDU Session Resource Setup List IE. Hence, according to the current standard specifications, when the Initial Context Setup procedure is used to purely setup the UE context but not to set up the first PDU sessions for the UE, the UE Aggregate Maximum Bit Rate is not provided from the AMF to the NG-RAN node.

The PDU Session Resource Setup procedure is used to setup the PDU session resources on Uu and NG-U for one or several PDU sessions and the corresponding QoS flows. The procedure is illustrated in FIG. 3. In this procedure, the "PDU Session Aggregate Maximum Bit Rate" IE is provided when at least one non-GBR QoS flow is being setup, but the UE Aggregate Maximum Bit Rate is not provided by the AMF to the NG-RAN node.

Hence, in a scenario where the AMF initializes the UE Context without setting up a first PDU session for the UE, and then later decides to use the PDU Session Setup procedure to setup the first PDU sessions, the AMF will never provide the UE Aggregate Maximum Bit Rate to the NG-RAN node and consequently, the NG-RAN node will not be able to perform the UE AMBR enforcement and the related traffic policing as required by the 5G system. The problematic scenario is illustrated in FIG. 4. Such a scenario is not addressed by current standard specifications. Notably, a similar problematic scenario also exists between the gNB-CU node and the gNB-DU node as illustrated in FIG. 5.

Hence, in accordance with some broad embodiments, various solutions are provided to enable a radio network node (e.g., the NG-RAN node, the gNB-DU) to have the UE AMBR associated with a wireless device prior to or when resources are to be set up.

According to one aspect, some embodiments include a method performed by a first network node. The method generally comprises sending a context setup request message to a second network node, the context setup request message not comprising a wireless device, WD, aggregate maximum bit rate, AMBR, value associated with a wireless device, determining that the first network node has not previously provided the WD AMBR value to the second network node in the context setup request message, and sending a resource setup request message to the second network node, the resource setup request message comprising the WD AMBR value associated with the wireless device.

The first network node may be a core network node (e.g., an Access and Mobility Management Function, AMF, node) while the second network node may be a radio network node (e.g., a Next-Generation Radio Access Network, NG-RAN, node). In such cases, the context setup request message may be an INITIAL CONTEXT SETUP REQUEST message, and/or the resource setup request message may be a PDU SESSION RESOURCE SETUP REQUEST message.

The first network node may be a central unit, CU, of a radio network node (e.g., a gNB-CU node) while the second network node may be a distributed unit, DU, of a radio network node (e.g., a gNB-DU node). In such cases, the context setup request message may be a UE CONTEXT SETUP REQUEST message, and/or the resource setup request message may be a UE CONTEXT MODIFICATION REQUEST message.

According to another aspect, some embodiments include a first network node adapted, configured, enabled, or otherwise operable, to perform one or more of the described first network node functionalities (e.g. actions, operations, steps, etc.).

In some embodiments, the first network node may comprise processing circuitry and one or more communication interfaces operatively connected to the processing circuitry. The one or more communication interfaces are configured to enable the first network node to communicate with one or more other radio network nodes (e.g., via a radio access network communication interface), with one or more core network nodes (e.g., via a core network communication interface), and/or with one or more other network nodes. The processing circuitry is configured to enable the first network node to perform one or more of the described first network node functionalities. In some embodiments, the processing circuitry may comprise at least one processor and at least one memory, the memory storing instructions which, upon being executed by the processor, configure the at least one processor to enable the first network node to perform one or more of the described first network node functionalities.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the first network node, they enable the first network node to perform one or more of the described first network node functionalities.

According to another aspect, some embodiments include a method performed by a second network node. The method generally comprises receiving a context setup request message from a first network node, the context setup request message not comprising a wireless device, WD, aggregate maximum bit rate, AMBR, value associated with a wireless device, receiving a resource setup request message from the first network node, the resource setup request message comprising the WD AMBR value associated with the wireless device, and controlling an aggregate bit rate of all non-guaranteed bit rate, non-GBR, downlink transmissions to the wireless device and/or uplink transmissions from the wireless device based, at least in part, on the WD AMBR value.

The method may comprise, or further comprise, storing the received WD AMBR value as part of a context of the wireless device.

The second network node may be a radio network node (e.g., a Next-Generation Radio Access Network, NG-RAN, node) while the first network node may be a core network node (e.g., Access and Mobility Management Function, AMF, node). In such cases, the context setup request message may be an INITIAL CONTEXT SETUP REQUEST message, and/or the resource setup request message may be a PDU SESSION RESOURCE SETUP REQUEST message.

The second network node may be a distributed unit, DU, of a radio network node (e.g., a gNB-DU node) while the first network node may be a central unit, CU, of a radio network node (e.g., a gNB-CU node). In such cases, the context setup request message may be a UE CONTEXT SETUP REQUEST message, and/or the resource setup request message may be a UE CONTEXT MODIFICATION REQUEST message.

According to another aspect, some embodiments include a second network node adapted, configured, enabled, or otherwise operable, to perform one or more of the described second network node functionalities (e.g. actions, operations, steps, etc.).

In some embodiments, the second network node may comprise processing circuitry and one or more communication interfaces operatively connected to the processing circuitry. The one or more communication interfaces are configured to enable the second network node to communicate with one or more other radio network nodes (e.g., via a radio access network communication interface), with one or more core network nodes (e.g., via a core network communication interface), and/or with one or more other network nodes. The processing circuitry is configured to enable the second network node to perform one or more of the described second network node functionalities. In some embodiments, the processing circuitry may comprise at least one processor and at least one memory, the memory storing instructions which, upon being executed by the processor, configure the at least one processor to enable the second network node to perform one or more of the described second network node functionalities.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the second network node, they enable the second network node to perform one or more of the described second network node functionalities.

Some embodiments may prevent the radio network node from not having the UE AMBR associated with a wireless device.

This summary is not an extensive overview of all contemplated embodiments, and is not intended to identify key or critical aspects or features of any embodiments or to delineate any embodiments. Other aspects and features will become apparent to those ordinarily skilled in the art upon review of the following description of specific embodiments with the figures.

BRIEF DESCRIPTION OF THE DRAWINGS

Exemplary embodiments will be described in more detail referring to the following figures, in which.

DETAILED DESCRIPTION

The embodiments set forth below represent information to enable those skilled in the art to practice the embodiments.

Upon reading the following description, given the accompanying figures, those skilled in the art will understand the concepts of the description and will recognize applications of these concepts not addressed herein. These concepts and applications fall within the scope of the description.

In the following description, numerous specific details are set forth. However, it is understood that embodiments may be practiced without these specific details. In other instances, well-known circuits, structures, and techniques have not been shown in order not to obscure the understanding of the description. Those of ordinary skill in the art, with the included description, can implement appropriate functionality without undue experimentation.

Figure 1:
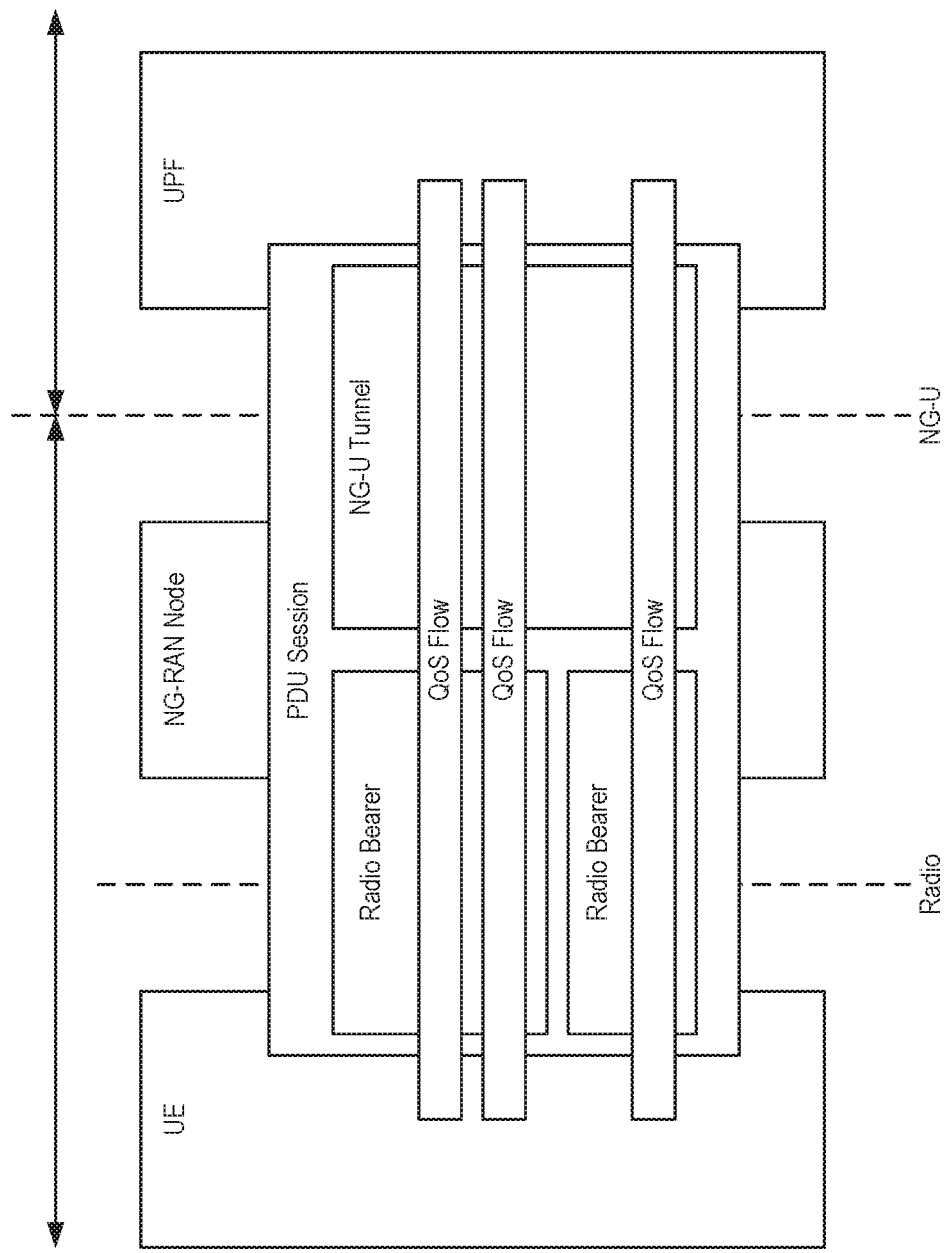
FIG. 1 is a schematic diagram of the PDU sessions and QoS flows architecture in a 5G system.
Figure 2:
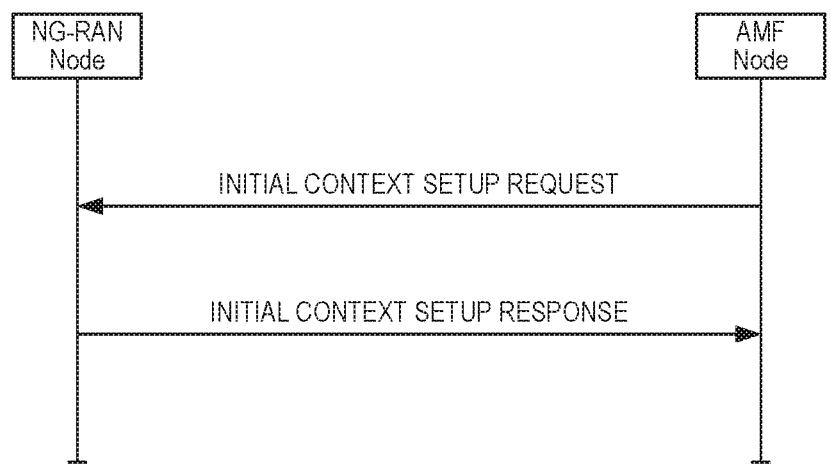
FIG. 2 is a signaling diagram of the Initial Context Setup procedure according to 3GPP TS 38.413 V15.2.0.
Figure 3:
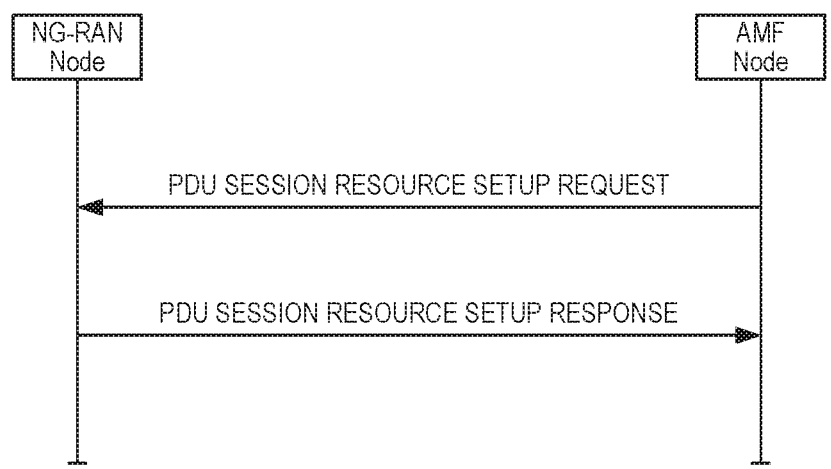
FIG. 3 is a signaling diagram of the PDU Session Resource Setup procedure according to 3GPP TS 38.413 V15.2.0.
Figure 4:
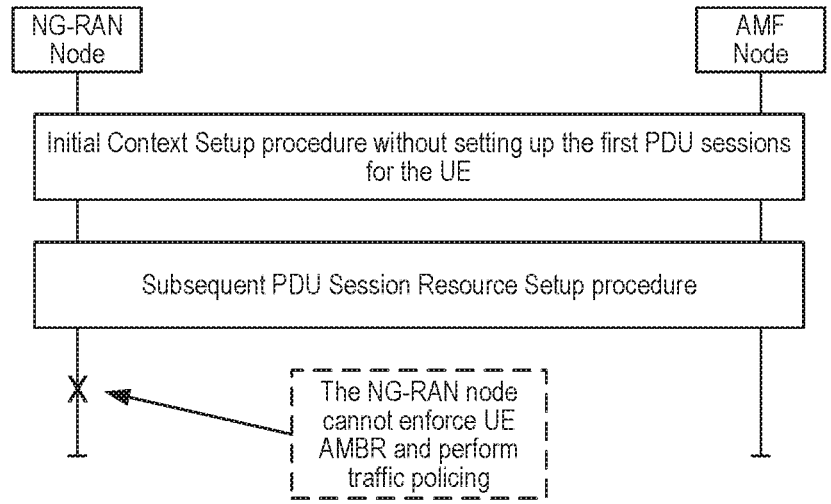
FIG. 4 is a signaling diagram of an example of a scenario where the NG-RAN node is not provided with the UE AMBR.
Figure 5:
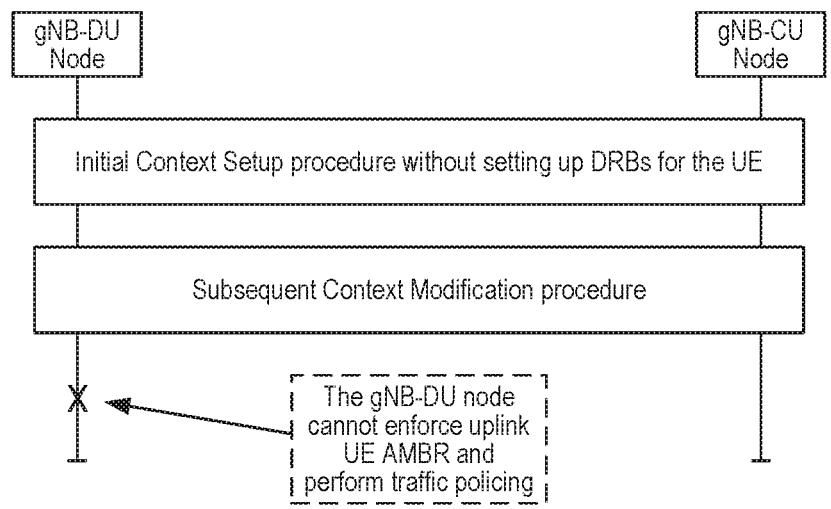
FIG. 5 is a signaling diagram of an example of a scenario where the gNB-DU node is not provided with the UE AMBR Uplink.
Figure 6:
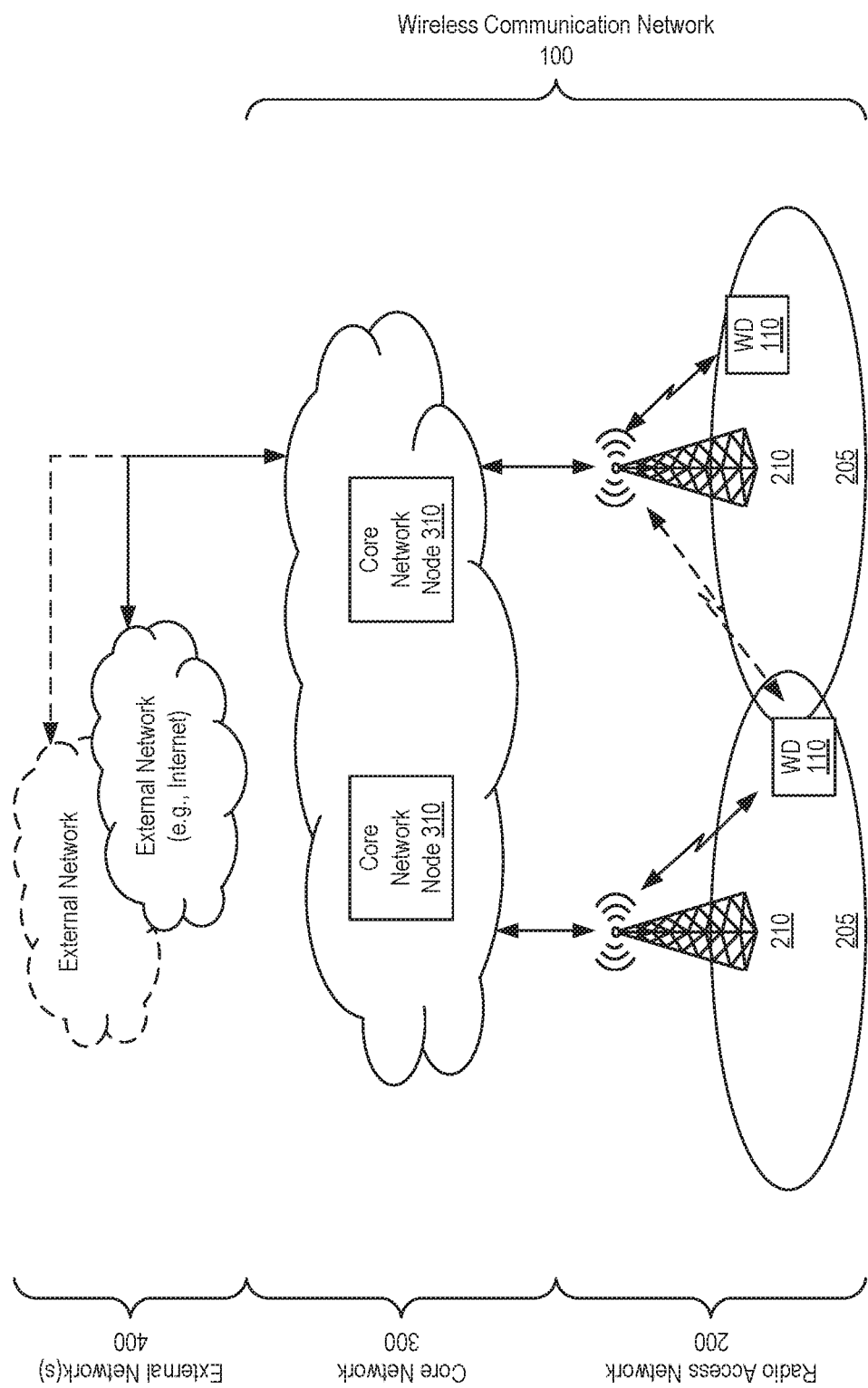
FIG. 6 is a schematic diagram of an example of a wireless communication network according to some embodiments.

Referring now to FIG. 6, an example of a wireless communication network 100 in which some embodiments may be deployed is depicted. The wireless communication network 100 generally enables wireless devices 110 to communicate with one or more external networks 400 via a radio access network 200 (also referred to a RAN) and a core network 300 (also referred to as CN).

The radio access network 200 generally comprises a plurality of radio network nodes 210 (only two are shown for clarity) which are responsible for providing radio access, over a radio interface, to wireless devices 110 (only two are shown for clarity) via one or more cells 205. Each cell 205 generally defines a geographical area associated to, and served by, a radio network node 210 where radio coverage is provided by the radio network node 210. Notably, one radio network node 210 may serve more than one cell 205, each of these cells possibly covering different geographical areas.

The core network 300, which connects the radio access network 200 to one or more external networks 400, generally comprises various core network nodes 310. Though generally referred to as core network nodes 310, these core network nodes 310 have different functions. For instance, some core network nodes 310 may be responsible for managing the connectivity of the wireless devices within the wireless communication network 100 while other core network nodes 310 may be responsible for handling the transmission of data between the wireless devices and the one or more external networks 400.

Figure 7:
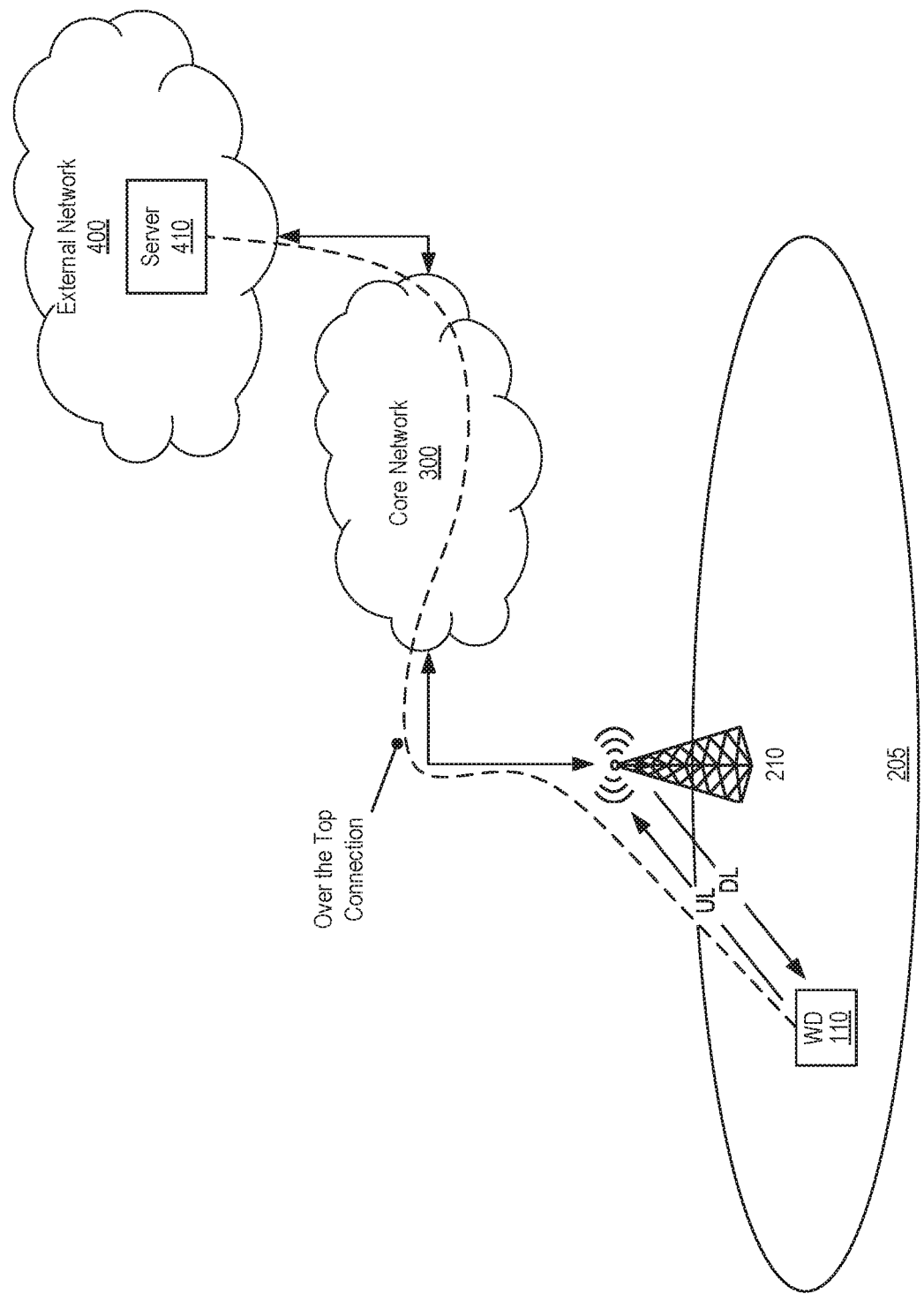
FIG. 7 is a schematic diagram of a portion of an example of a wireless communication network showing example signaling according to some embodiments.

Turning now to FIG. 7, additional details of the radio interface between a wireless device 110 and a radio network node 210 are shown. As illustrated, the radio interface generally enables the wireless device 110 and the radio network node 210 to exchange signals and messages in both a downlink direction, that is from the radio network node 210 to the wireless device 110, and in an uplink direction, that is from the wireless device 110 to the radio network node 210.

The radio interface between the wireless device 110 and the radio network node 210 typically enables the wireless device 110 to access various applications or services provided by one or more servers 410 (also referred to as application server or host computer) located in the external network(s) 400. The connectivity between the wireless device 110 and the server 410, enabled at least in part by the radio interface between the wireless device 110 and the radio network node 210, may be described as an over-the-top (OTT) connection. In such cases, the wireless device 110 and the server 410 are configured to exchange data and/or signaling via the OTT connection, using the radio access network 200, the core network 300, and possibly one or more intermediate networks (e.g., a transport network) (not shown). The OTT connection may be transparent in the sense that the participating communication devices or nodes (e.g., the radio network node, one or more core network nodes, etc.) through which the OTT connection passes may be unaware of the actual OTT connection they enable and support. For example, the radio network node 210 may not or need not be informed about the previous handling (e.g., routing) of an incoming downlink communication with data originating from the server 410 to be forwarded or transmitted to the wireless device 110. Similarly, the radio network node 210 may not or need not be aware of the subsequent handling of an outgoing uplink communication originating from the wireless device 110 towards the server 410.

As indicated above, in embodiments where the wireless communication network 100 is deployed as a 5G system (5GS), it is possible for a radio network node 210 (e.g., an NG-RAN node or a gNB-DU node) to not have or otherwise to lack the aggregate maximum bit rate value associated with a wireless device 110 (also referred to as WD AMBR value or UE AMBR value), thereby rendering the radio network node 210 unable to enforce the WD AMBR value and perform traffic policing based on this value.

Hence, according to some embodiments, it is not made mandatory for the Initial Context Setup Request message (used on the NG (or N2) interface between the AMF and the NG-RAN node) to carry the WD AMBR value (referred to as UE Aggregate Maximum Bit Rate IE in 3GPP TS 38.413 V15.2.0). However, the AMF provides the WD AMBR to the NG-RAN node in a PDU Session Resource Setup Request message when the AMF determines that it has not previously sent the WD AMBR value to the NG-RAN node. Similarly, it is not made mandatory for the UE Context Setup Request message (used on the F1 interface between the gNB-CU node and the gNB-DU node) to carry the WD AMBR value (referred to as gNB-DU UE Aggregate Maximum Bit Rate Uplink IE in 3GPP TS 38.473 V15.4.1). However, the gNB-CU node provides the WD AMBR to the gNB-DU node in a UE Context Modification Request message when the gNB-CU determines that it has not previously sent the WD AMBR value to the gNB-DU node. Such a solution may require the AMF (or gNB-CU node) to keep track of which NG-RAN node (or gNB-DU node) has been provided with the WD AMBR value.

Figure 8:
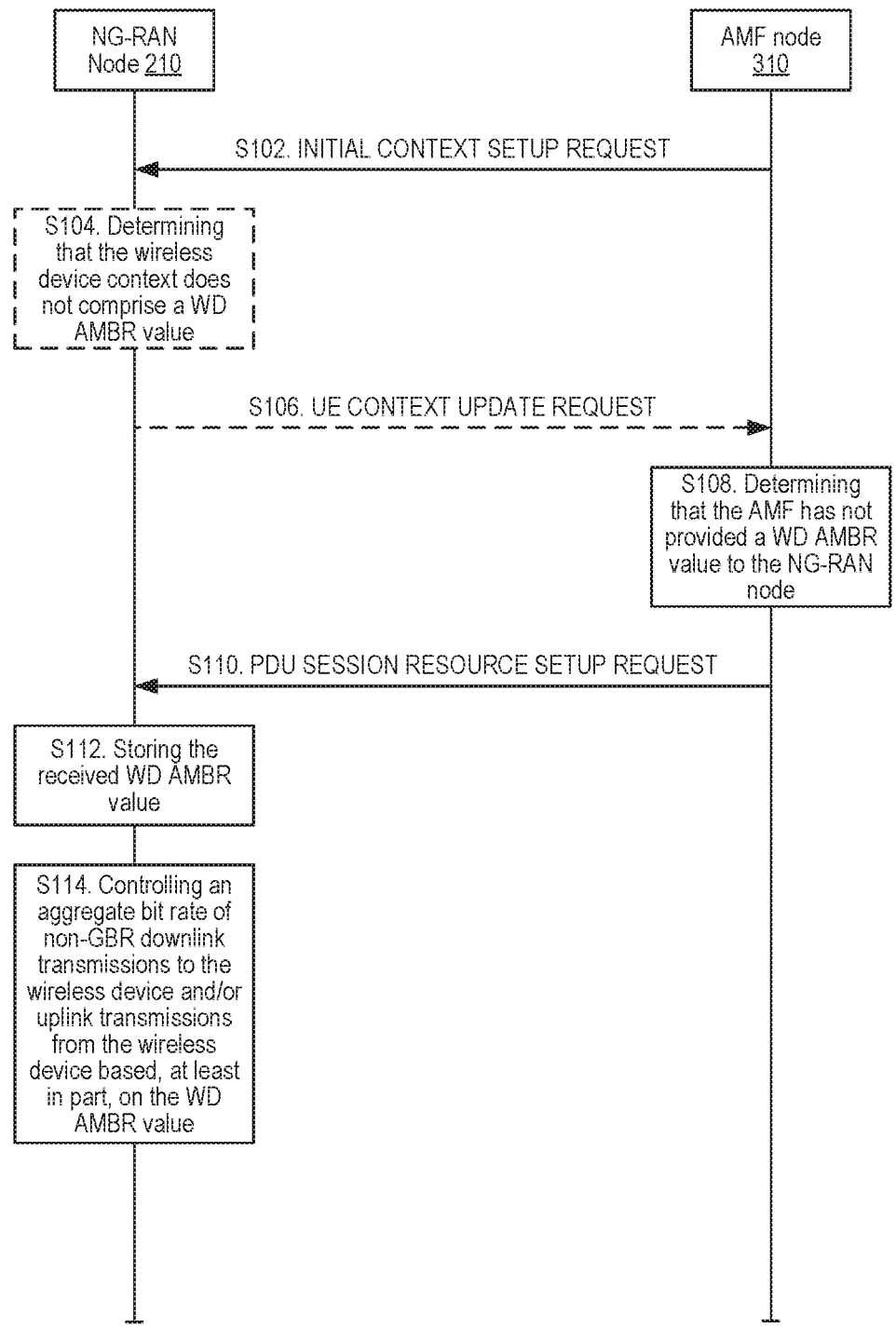
FIGS. 8 and 9 are signaling and operating diagrams according to some embodiments.
Figure 9:
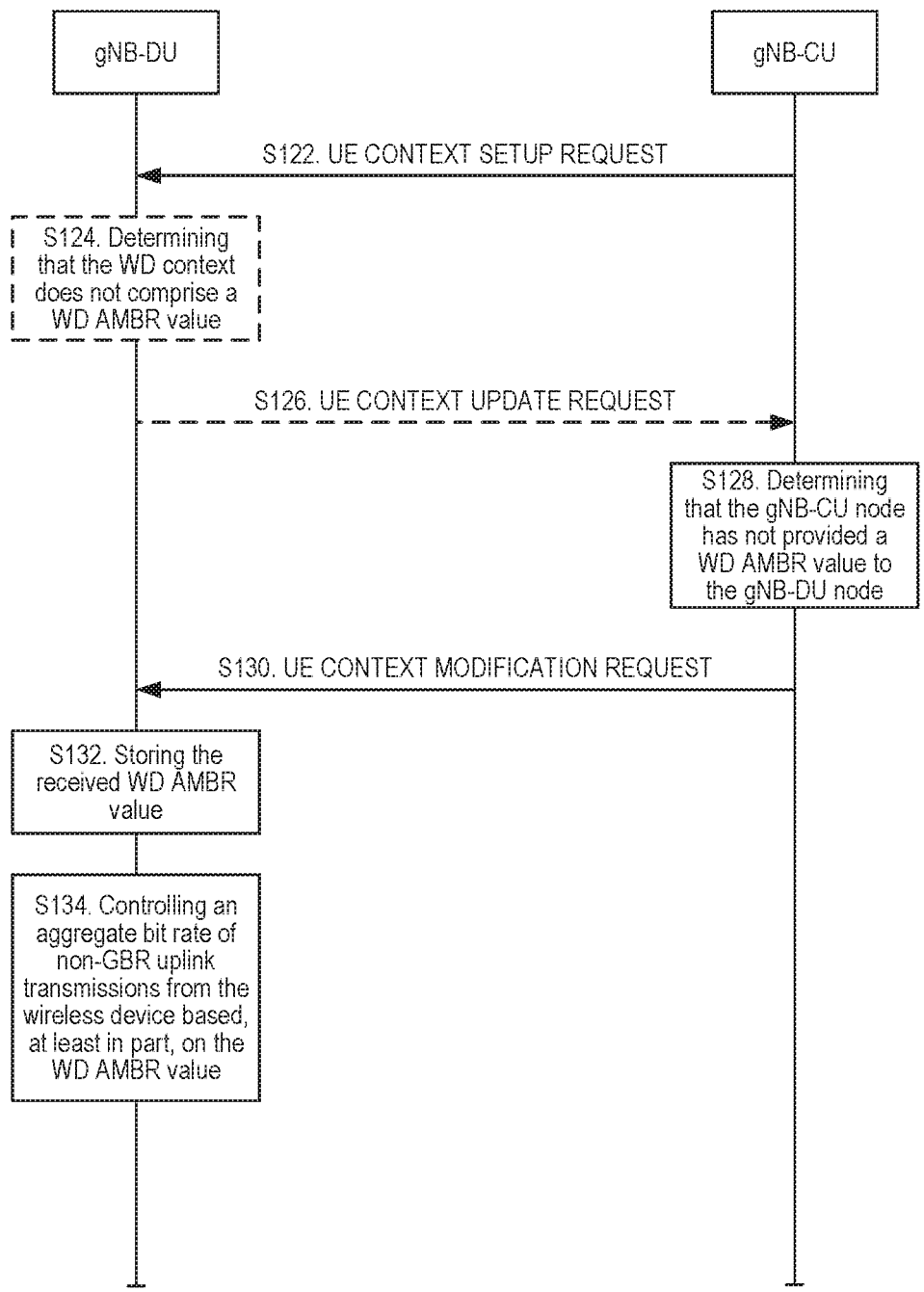

Referring now to FIGS. 8 and 9, high-level signaling and operating diagrams according to some embodiments are illustrated. The embodiment illustrated in FIG. 8 is based on the signaling between an AMF node and an NG-RAN node over the NG (or N2) interface. The embodiment illustrated in FIG. 9 is based on the signaling between a gNB-CU node and a gNB-DU node over the F1 interface.

Starting with FIG. 8, as illustrated, the AMF node sends an Initial Context Setup Request message to the NG-RAN node (action S102). The Initial Context Setup Request message does not necessarily comprise the WD AMBR value since the presence of the WD AMBR value is conditional. Here, it is assumed that the Initial Context Setup Request message does not comprise the WD AMBR value.

Upon receiving the Initial Context Setup Request message from the AMF node, the NG-RAN node creates or otherwise establishes the initial context associated with the wireless device.

At some later point, and usually prior to sending a PDU Session Resource Setup Request message to the NG-RAN node for the NG-RAN node to assign resources for one or more PDU sessions and to setup DRBs for the wireless device, the AMF node determines that it has not previously sent the WD AMBR value to the NG-RAN node (action S108). This may be the case if the AMF node did not send the WD AMBR value in the Initial Context Setup Request message.

In some embodiments, the AMF node may determine that it has not previously sent the WD AMBR value to the NG-RAN node by keeping track of whether the NG-RAN node has been provided with the WD AMBR value.

Alternatively, in some embodiments, the AMF node may determine that it has not previously sent the WD AMBR value to the NG-RAN node upon receiving a request from the NG-RAN node exemplified in FIG. 8 by the UE Context Update Request message sent by the NG-RAN node to the AMF node (action S106). The NG-RAN node may send such a request to the AMF node upon itself determining that the NG-RAN node does not have a WD AMBR value in the wireless device context (action S104). Understandably, the exact label of the request message sent by the NG-RAN node to the AMF node to request the WD AMBR value could differ from the one mentioned above.

Then, the AMF node sends the PDU Session Resource Setup Request message to the NG-RAN node for the NG-RAN node to assign resources for one or more PDU sessions and to setup DRBs for the wireless device (action S110). Notably, since the AMF node has determined that it has not previously sent the WD AMBR value to the NG-RAN node, the AMF node includes the WD AMBR value in the PDU Session Resource Setup Request message such that the PDU Session Resource Setup Request message comprises the WD AMBR value.

Following the reception of the PDU Session Resource Setup Request message comprising the WD AMBR value, the NG-RAN node stores the WD AMBR in the wireless device context associated with the wireless device (action S112). If, for some reasons, the wireless device context already had a WD AMBR stored therein, the NG-RAN node may either overwrite the existing WD MABR value with the WD AMBR received in the PDU Session Resource Setup Request message or, alternatively, keep the existing WD MABR value and ignore the WD AMBR value received in the PDU Session Resource Setup Request message.

Following the establishment of the PDU sessions, the NG-RAN node controls the aggregate bit rate of all the non-GBR transmissions of the wireless device using the stored WD AMBR value (action S114).

Turning now to FIG. 9, as illustrated, the gNB-CU node sends a UE Context Setup Request message to the gNB-DU node (action S122). The UE Context Setup Request message does not necessarily comprise the WD AMBR value since the presence of the WD AMBR value is conditional. Here, it is assumed that the UE Context Setup Request message does not comprise the WD AMBR value.

Upon receiving the UE Context Setup Request message from the gNB-CU node, the gNB-DU node creates or otherwise establishes the context associated with the wireless device.

At some later point, and usually prior to sending a UE Context Modification Request message to the gNB-DU node for the gNB-DU node to setup DRBs for the wireless device, the gNB-CU node determines that it has not previously sent the WD AMBR value to the gNB-DU node (action S128). This may be the case if the gNB-CU node did not send the WD AMBR value in the UE Context Setup Request message.

In some embodiments, the gNB-CU node may determine that it has not previously sent the WD AMBR value to the gNB-DU node by keeping track of whether the gNB-DU node has been provided with the WD AMBR value.

Alternatively, in some embodiments, the gNB-CU node may determine that it has not previously sent the WD AMBR value to the gNB-DU node upon receiving a request from the gNB-DU node exemplified in FIG. 9 by the UE Context Update Request message sent by the gNB-DU node to the gNB-CU node (action S126). The gNB-DU node may send such a request to the gNB-CU node upon itself determining that the gNB-DU node does not have a WD AMBR value in the wireless device context (action S124). Understandably, the exact label of the request message sent by the gNB-DU node to the gNB-CU node to request the WD AMBR value could differ from the one mentioned above.

Then, the gNB-CU node sends the UE Context Modification Request message to the gNB-DU node for the gNB-DU node to setup DRBs for the wireless device (action S130). Notably, since the gNB-CU node has determined that it has not previously sent the WD AMBR value to the gNB-DU node, the gNB-CU node includes the WD AMBR value in the UE Context Modification Request message such that the UE Context Modification Request message comprises the WD AMBR value.

Following the reception of the UE Context Modification Request message comprising the WD AMBR value, the gNB-DU node stores the WD AMBR in the wireless device context associated with the wireless device (action S132). If, for some reasons, the wireless device context already had a WD AMBR stored therein, the gNB-DU node may either overwrite the existing WD AMBR value with the WD AMBR received in the UE Context Modification Request message or, alternatively, keep the existing WD AMBR value and ignore the WD AMBR value received in the UE Context Modification Request message Following the establishment of the DRBs, the gNB-DU node controls the aggregate bit rate of all the non-GBR uplink transmissions from the wireless device using the stored WD AMBR value (action S134).

Figure 10:
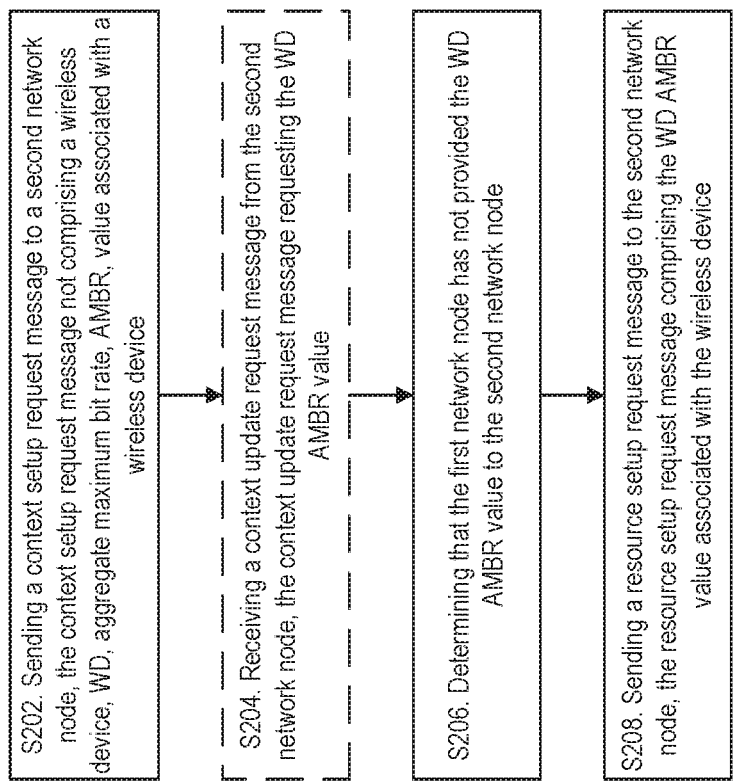
FIG. 10 is a flow chart of operations of a first network node according to some embodiments.
Figure 11:
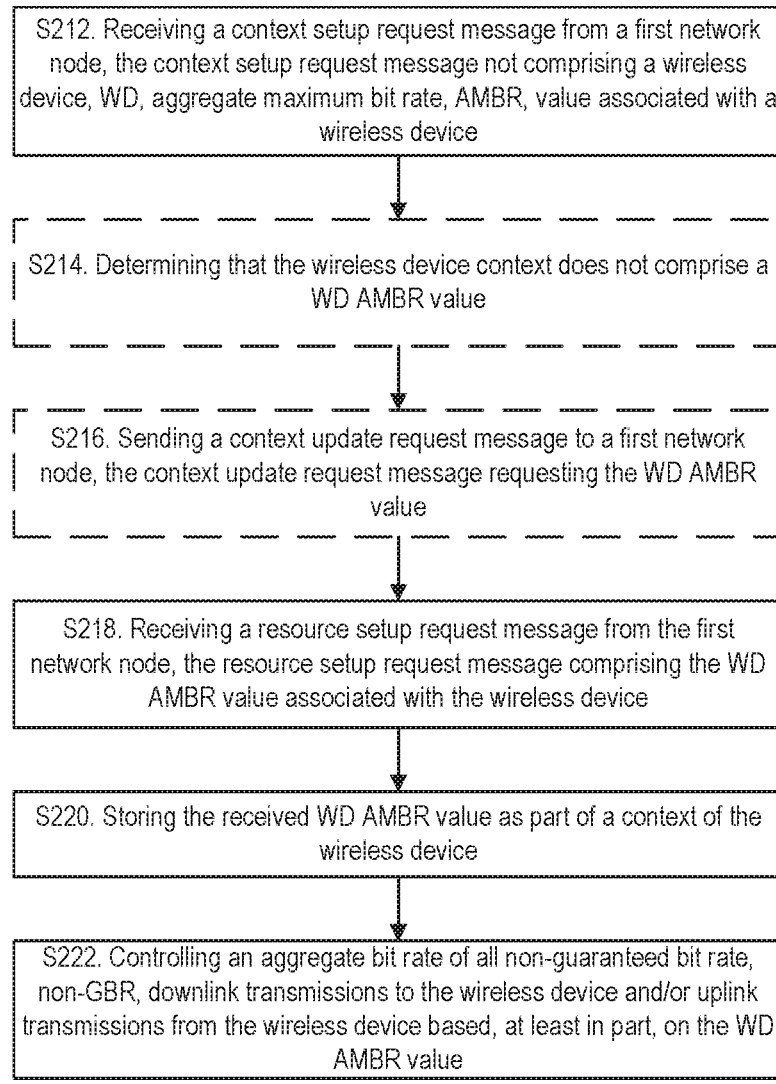
FIG. 11 is a flow chart of operations of a second network node according to some embodiments.

Referring to FIGS. 10 and 11, the two flow charts illustrate operations of a first network node (e.g., an AMF node, a gNB-CU node) and of a second network node (e.g., a NG-RAN node, a gNB-DU node), respectively, according to some embodiments.

As illustrated in FIG. 10, the first network node sends a context setup request message (e.g., an Initial Context Setup Request message, a UE Context Setup Request message) to a second network node (action S202), the context setup request message not comprising a WD AMBR value associated with a wireless device, that is the wireless device for which a context needs to be set up.

Subsequently, the first network node determines that it has not previously sent the WD AMBR value to the second network node (action S206).

In some embodiments, the first network node may determine that it has not previously sent the WD AMBR value to the second network node by keeping track of whether it has provided the WD AMBR value to the second network node.

Alternatively, in some embodiments, the first network node may determine that it has not previously sent the WD AMBR value to the second network node upon receiving a context update request message from the second network node (action S204). The context update request message may comprise an implicit (e.g., a message type) or explicit request (e.g., a bit or flag set to a specified value, a predetermined bitmap, an information element, etc.) for the WD AMBR value.

Subsequently, the first network node sends a resource setup request message (e.g., a PDU Session Resource Setup Request message, a UE Context Modification Request message) to the second network node (action S208), the context modification request message comprising the WD AMBR value associated with the wireless device.

In FIG. 11, the second network node receives a context setup request message (e.g., an Initial Context Setup Request message, a UE Context Setup Request message) from the first network node, the context setup request message not comprising a WD AMBR value associated with a wireless device (actions S212).

Subsequently, the second network node receives a resource setup request message (e.g., a PDU Session Resource Setup Request message, a UE Context Modification Request message) from the first network node (action S218), the resource setup request message comprising the WD AMBR value associated with the wireless device.

In some embodiments, prior to receiving the resource setup request message from the first network node, the second network node may determine that it has no WD AMBR value in the context of the wireless device (action S214) and then send a context update request message to the first network node, the context update request message requesting the WD AMBR value (action S216). Again, the context update request message may comprise an implicit (e.g., a message type) or explicit request (e.g., a bit or flag set to a specified value, a predetermined bitmap, an information element, etc.) for the WD AMBR value.

After having received the resource setup request message from the first network node, the second network stores the received WD AMBR value as part of the context of the wireless device (action S220). Though not shown, upon receiving the resource setup request message, the second network node sets up the required resources for the wireless device.

The second network node then controls an aggregate bit rate of all non-GBR downlink transmissions to the wireless device and/or uplink transmissions from the wireless device based, at least in part, on the WD AMBR value (action S222).

It is to be noted that in the previously described signaling and operating diagrams and flow charts, unless the description clearly indicates a certain relationship (e.g., causal, conditional, temporal, etc.) between two or more actions, the described actions may be performed in a different sequence than the one illustrated. For example, two actions shown performed in succession may be performed substantially concurrently, or even in the reverse order. Hence, the illustrated sequences of actions are only indicative of particular sequences of actions and do not suggest that these are the only possible sequences.

Embodiments of a radio network node 210 will now be described with respect to FIGS. 12 and 13. Briefly, FIG. 12 illustrates what can be called an integrated radio network node 210, and FIG. 13 illustrates what can be called a distributed radio network node 210.

Though the expression "radio network node" is used throughout the description, it is to be understood that the expression is used generically. A radio network node generally refers to an equipment, or a combination of equipments, arranged, capable, configured, and/or operable to communicate directly or indirectly with wireless devices and/or with other network nodes (e.g., other radio network nodes, core network nodes, etc.) in the wireless communication network 100 to enable and/or provide wireless access to the wireless devices 110 and/or to perform other functions (e.g., administration) in the wireless communication network 100.

Different communication standards may use different terminology when referring to or describing a radio network node. For instance, 3GPP uses the terms Node B (NB), evolved Node B (eNB), next-generation Node B (gNB), gNB Central Unit (gNB-CU), gNB Distributed Unit (gNB-DU), Next-Generation Radio Access Network node (NG-RAN node), Radio Network Controller (RNC), and Base Station (BS). 3GPP2 uses the terms Access Node (AN), Base Station (BS), and Base Station Controller (BSC). IEEE 802.11 (also known as WiFi™) uses the access point (AP). Understandably, the generic expression "radio network node" encompasses these terms.

Figure 12:
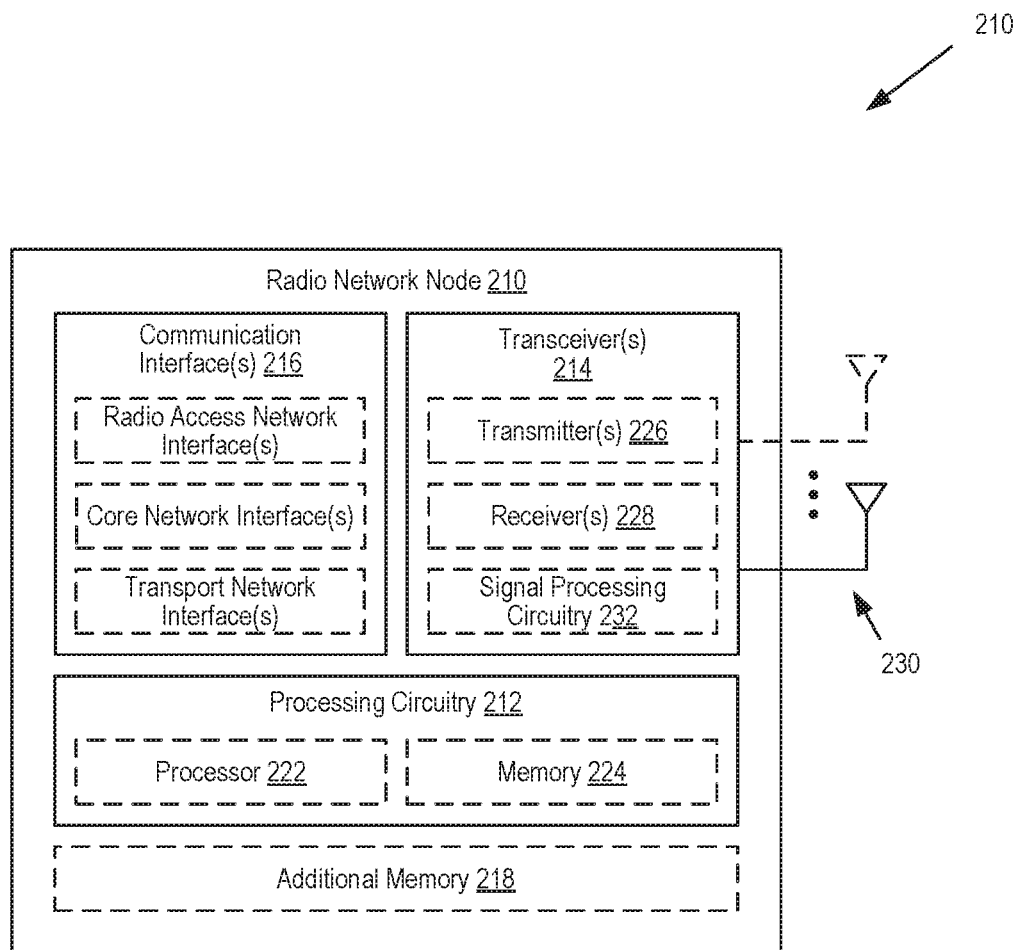
FIG. 12 is a block diagram of a radio network node according to some embodiments.
Figure 13:
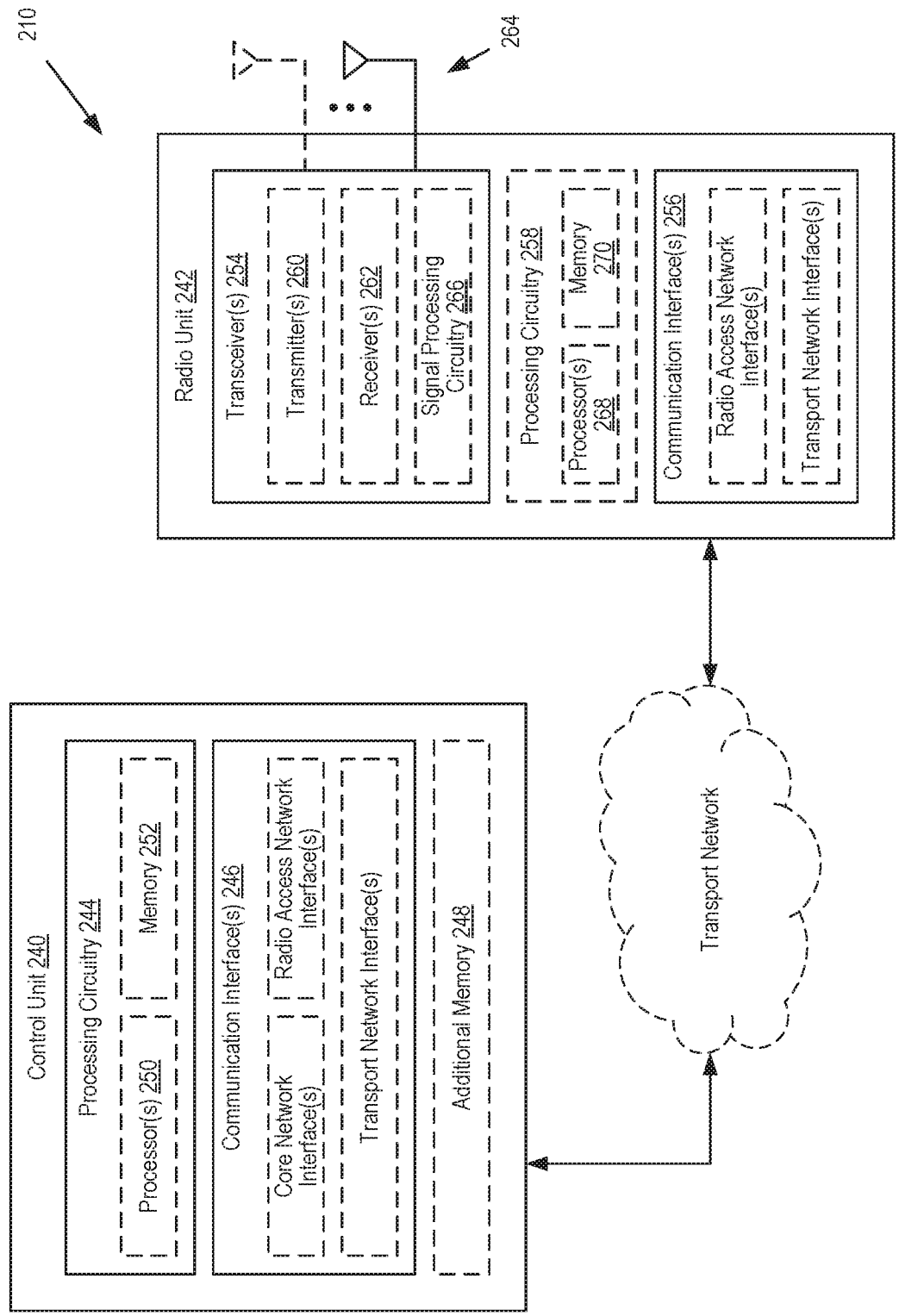
FIG. 13 is another block diagram of a radio network node according to some embodiments.

FIG. 12 is a block diagram of an example of a radio network node 210 according to some embodiments. Radio network node 210 generally includes processing circuitry 212, one or more transceivers 214, and communication interface(s) 216. Radio network node 210 may also comprise additional memory 218.

The processing circuitry 212 usually provides overall control of the radio network node 210. Hence, the processing circuitry 212 is generally responsible for the various functions of the radio network node 210, either directly or indirectly via one or more other components of the radio network node (e.g., sending or receiving messages via the transceiver 214). The processing circuitry 212 may include any suitable combination of hardware to enable the radio network node 210 to perform its functions. In some embodiments, the processing circuitry 212 may comprise at least one processor 222 and at least one memory 224. Examples of processor 222 include, but are not limited to, a central processing unit (CPU), a graphical processing unit (GPU), and other forms of processing unit. Examples of memory 224 include, but are not limited to, Random Access Memory (RAM) and Read Only Memory (ROM). When processing circuitry 212 comprises memory 224, memory 224 is generally configured to store instructions or codes executable by the processor 222, and possibly operational data. The processor 222 is then configured to execute the stored instructions and possibly create, transform, or otherwise manipulate data to enable the radio network node 210 to perform its functions. Additionally, or alternatively, in some embodiments, the processing circuity 212 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 212 comprises application-specific and/or programmable circuitry (e.g., ASICs, CPLDs, FPGAs, etc.), the radio network node 210 may perform its functions without the need for instructions or codes as the necessary instructions may already be hardwired or preprogrammed into the processing circuitry 212. Understandably, the processing circuitry 212 may comprise a combination of one or more processors 222, memories 224, and other application-specific and/or programmable circuitry.

The transceiver 214 facilitates transmitting wireless signals to and receiving wireless signals from wireless devices 110 and/or other radio network node 210. Transceiver 214 typically includes one or more transmitters 226, and one or more receivers 228 connected to one or more antennas 230. Transceiver 214 may also comprise signal processing circuitry 232 configured to process the data received from the processing circuitry 212 for transmission via the transmitter(s) 226 and antenna(s) 230, and to process the wireless signals received via the antenna(s) 230 and receiver(s) 228. Signal processing circuitry 232 may comprise any suitable combination of analog signal processing hardware (e.g., amplifier, filter, etc.) and digital signal processing hardware (e.g., digital signal processor (DSP)).

When present, additional memory 218 may comprise any form of memory, including volatile and/or non-volatile memory, configured to store instructions and/or data that may be used by the processing circuitry 212. Examples of additional memory 218 include, but are not limited to, mass storage media (e.g., a hard disk drive, a solid-state drive), removable storage media (e.g., a Compact Disk (CD), a Digital Video Disk (DVD), a memory card).

The communication interface 216 enables the radio network node 210 to send messages to and receive messages from other network nodes (e.g., other radio network nodes, core network nodes, servers, etc.). In that sense, the communication interface 216 generally comprises the necessary hardware and software to process messages received from the processing circuitry 212 to be sent by the radio network node 210 into a format appropriate for the underlying transport network and, conversely, to process messages received from other network nodes over the underlying transport network into a format appropriate for the processing circuitry 212. The communication interface 216 may therefore comprise the appropriate instructions to process messages exchanged over logical interfaces including, but not limited to, radio access network interfaces (e.g., the X2 and Xn logical interfaces) and core network interfaces (e.g., the S1 and N2 logical interfaces). Hence, communication interface 216 may comprise appropriate hardware (e.g., port, modem, network interface card, etc.) and software, including protocol conversion and data processing capabilities, to communicate with other network nodes.

FIG. 13 is a block diagram of an example of a distributed radio network node 210 according to some embodiments. A distributed radio network node 210, such as the example illustrated in FIG. 13, is distributed in the sense that the radio network node 210 components, and their associated functions, are essentially separated into two main units (or sub-radio network nodes) which may be referred to as a control unit 240 and a radio unit 242. Different distributed radio network node architectures are possible. For instance, in some architectures, the radio unit 242 is connected to the control unit 240 via dedicated wired or wireless link (e.g., an optical fiber cable) while in other architectures, the radio unit 242 is connected to the control unit 240 via a transport network. Also, how the functions of the radio network node 210 are separated between the control unit 240 and radio unit 242 may vary depending on the chosen architecture. Still, in the context of the NG-RAN architecture described in 3GPP TS 38.401 V15.4.0, the control unit 240 may correspond to the gNB-CU while the radio unit 242 may correspond to the gNB-DU.

The control unit 240 generally includes processing circuitry 244 and communication interface(s) 246. Control unit 240 may also comprise additional memory 248.

The processing circuitry 244 usually provides overall control of the control unit 240. The processing circuitry 244 is generally responsible for at least some functions of the radio network node 210, either directly or indirectly via one or more other components of the control unit 240 (e.g., sending or receiving messages via the communication interface 246). The processing circuitry 244 may include any suitable combination of hardware to enable the control unit 240 to perform its share of the functions of radio network node 210. In some embodiments, the processing circuitry 244 may comprise at least one processor 250 and at least one memory 252. Examples of processor 250 include, but are not limited to, a central processing unit (CPU), a graphical processing unit (GPU), and other forms of processing unit. Examples of memory 252 include, but are not limited to, Random Access Memory (RAM) and Read Only Memory (ROM). When processing circuitry 244 comprises memory 252, memory 252 is generally configured to store instructions or codes executable by processor 250, and possibly operational data. Processor 250 is then configured to execute the stored instructions and possibly create, transform, or otherwise manipulate data to enable the control unit 240 to perform its share of the functions of radio network node 210. Additionally, or alternatively, in some embodiments, the processing circuity 244 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 244 comprises application-specific and/or programmable circuitry (e.g., ASICs, CLPDs, FPGAs, etc.), the control unit 240 may perform its share of the functions of radio network node 210 without the need for instructions or codes as the necessary instructions may already be hardwired or preprogrammed into the processing circuitry 244. Understandably, the processing circuitry 244 may comprise a combination of one or more processors 250, memories 252, and other application-specific and/or programmable circuitry.

When present, additional memory 248 may comprise any form of memory, including volatile and/or non-volatile memory, configured to store instructions and/or data that may be used by the processing circuitry 244. Examples of additional memory 248 include, but are not limited to, mass storage media (e.g., a hard disk drive, a solid-state drive), removable storage media (e.g., a Compact Disk (CD), a Digital Video Disk (DVD), a memory card).

The communication interface 246 enables the control unit 240 of the radio network node 210 to send messages to and receive messages from the radio unit 242 and also to and from other network nodes (e.g., control units of other radio network nodes, other radio network nodes, core network nodes, servers, etc.). In that sense, the communication interface 246 generally comprises the necessary hardware and software to process messages received from the processing circuitry 242 to be sent by the control unit 240 of the radio network node 210 into a format appropriate for the underlying transport network and, conversely, to process messages received over the underlying transport network into a format appropriate for the processing circuitry 242. The communication interface 246 may therefore comprise the appropriate instructions to process messages exchanged over logical interfaces including, but not limited to, radio access network interfaces (e.g., the F1 and Xn logical interfaces) and core network interfaces (e.g., the N2 logical interface). Hence, communication interface 246 may comprise appropriate hardware (e.g., port, modem, network interface card, etc.) and software, including protocol conversion and data processing capabilities, to communicate with the radio unit 242 and with other network nodes.

The radio unit 242 generally includes one or more transceivers 254, and communication interface(s) 256. Control unit 240 may also comprise processing circuitry 258.

The transceiver 254 facilitates transmitting wireless signals to and receiving wireless signals from wireless devices 110 and/or other radio network node 210. Transceiver 254 typically includes one or more transmitters 260, and one or more receivers 262 connected to one or more antennas 264. Transceiver 254 may also comprise signal processing circuitry 266 configured to process the data received from the communication interface 256, or from the processing circuitry 258 if present, for transmission via the transmitter(s) 260 and antenna(s) 264, and to process the wireless signals received via the antenna(s) 264 and receiver(s) 262. Signal processing circuitry 266 may comprise any suitable combination of analog signal processing hardware (e.g., amplifier, filter, etc.) and digital signal processing hardware (e.g., digital signal processor (DSP)).

The communication interface(s) 256 enable the radio unit 242 to send messages to and receive messages from the control unit 240 and possibly to and from other network nodes (e.g., other radio network nodes, core network nodes, servers, etc.). In that sense, the communication interface 256 generally comprises the necessary hardware and software to process messages to be sent by radio unit 242 into a format appropriate for the underlying transport network and, conversely, to process messages received by the radio unit 242 (e.g., from the control unit 240) via the underlying transport network. Hence, communication interface 256 may comprise appropriate hardware (e.g., port, modem, network interface card, etc.) and software, including protocol conversion and data processing capabilities, to communicate with other network nodes.

When present, the processing circuitry 258 usually provides overall control of the radio unit 242. The processing circuitry 258 is generally responsible for at least some functions of the radio network node 210, either directly or indirectly via one or more other components of the radio unit 242 (e.g., sending or receiving messages via the transceiver 254, sending or receiving messages via the communication interface 256). The processing circuitry 258 may include any suitable combination of hardware to enable the radio unit 242 to perform its share of the functions of radio network node 210. In some embodiments, the processing circuitry 258 may comprise at least one processor 268 and at least one memory 270. Examples of processor 268 include, but are not limited to, a central processing unit (CPU), a graphical processing unit (GPU), and other forms of processing unit. Examples of memory 270 include, but are not limited to, Random Access Memory (RAM) and Read Only Memory (ROM). When processing circuitry 258 comprises memory 270, memory 270 is generally configured to store instructions or codes executable by processor 268, and possibly operational data. The processor 268 is then configured to execute the stored instructions and possibly create, transform, or otherwise manipulate data to enable the radio unit 242 to perform its share of the functions of radio network node 210. Additionally, or alternatively, in some embodiments, the processing circuity 258 may comprise one or more application-specific integrated circuits (ASICs), one or more complex programmable logic device (CPLDs), one or more field-programmable gate arrays (FPGAs), or other forms of application-specific and/or programmable circuitry. When the processing circuitry 258 comprises application-specific and/or programmable circuitry (e.g., ASICs, CLPDs, FPGAs, etc.), the radio unit 242 may perform its share of the functions of radio network node 210 without the need for instructions or codes as the necessary instructions may already be hardwired or preprogrammed into the processing circuitry 258. Understandably, the processing circuitry 258 may comprise a combination of one or more processors 268, memories 270, and other application-specific and/or programmable circuitry.

An embodiment of a core network node 310 will now be described referred to FIG. 14. Though the expression "core network node" is used throughout the description, it is to be understood that the expression is used generically. A core network node 310 generally refers to a network node arranged, capable, configured, and/or operable to communicate with one or more radio network nodes, with one or more other core network nodes, and/or possibly with network nodes or servers in the external network(s) 410. Understandably, different core network nodes 310 may provide or enable different functionalities in the wireless communication network 100.

Different core network architectures may use different terminology when referring to the various core network nodes that can be deployed. For instance, the 3GPP Evolved Packet Core (EPC) architecture comprises Mobility Management Entity (MME), Serving Gateway (SGW), and Packet Data Network (PDN) Gateway (PGW), while the 3GPP 5G Core (5GC) architecture comprises Access and Mobility Management Function (AMF), Session Management Function (SMF), and User Plane Function (UPF). A more complete list of the different EPC and 5GC core network nodes 310 can be found in 3GPP TS 23.401 and 23.501 respectively.

Figure 14:
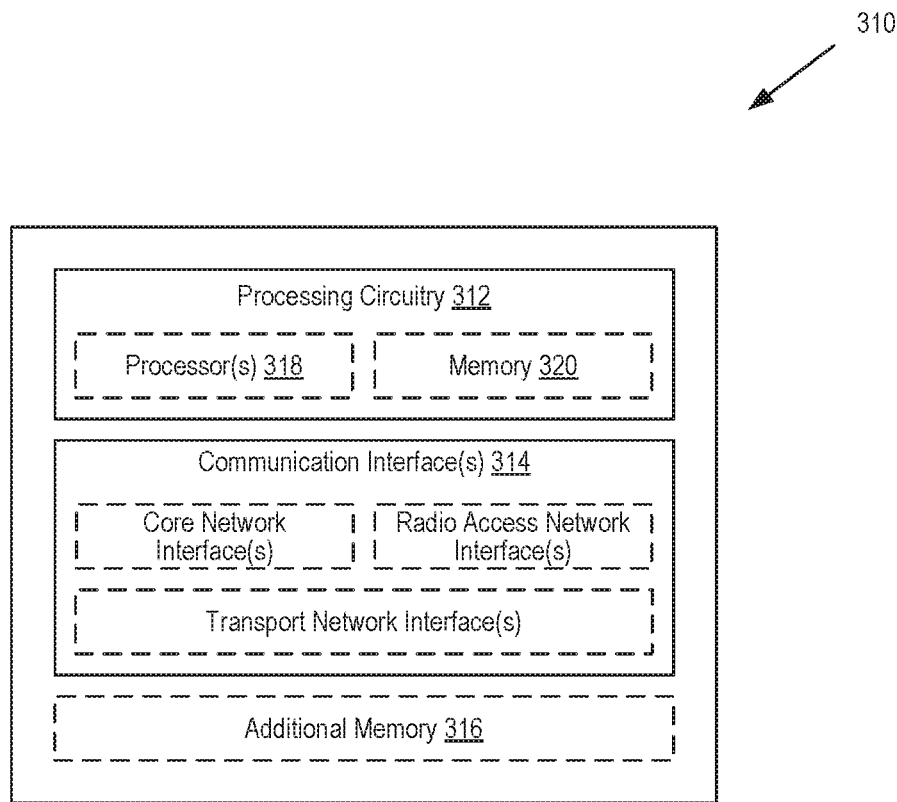
FIG. 14 is a block diagram of a core network node according to some embodiments.

FIG. 14 is a block diagram of an example of a core network node 310 according to some embodiments. Core network node 310 usually includes processing circuitry 312 and communication interface(s) 314. Core network 310 may also include additional memory 316.

Processing circuitry 312 usually provides overall control of the core network node 310. Hence, processing circuitry 312 is generally responsible for the various functions of the core network node 310, either directly or indirectly via one or more other components of the core network node 310 (e.g., sending or receiving messages via the communication interface 314). The processing circuitry 312 may include any suitable combination of hardware to enable the core network node 310 to perform its functions. In some embodiments, the processing circuitry 312 may comprise at least one processor 318 and at least one memory 320. Examples of processor 318 include, but are not limited to, a central processing unit (CPU), a graphical processing unit (GPU), and other forms of processing unit. Examples of memory 320 include, but are not limited to, Random Access Memory (RAM) and Read Only Memory (ROM). When processing circuitry 312 comprises memory 320, memory 320 is generally configured to store instructions or codes executable by processor 318, and possibly operational data. The processor 318 is then configured to execute the stored instructions and possibly create, transform, or otherwise manipulate data to enable the core network node 310 to perform its functions. Additionally, or alternatively, in some embodiments, the processing circuity 312 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 312 comprises application-specific and/or programmable circuitry (e.g., ASICs, CPLDs, FPGAs, etc.), the core network node 310 may perform its functions without the need for instructions or codes as the necessary instructions may already be hardwired or preprogrammed into processing circuitry 312. Understandably, processing circuitry 312 may comprise a combination of one or more processors 318, memories 320, and other application-specific and/or programmable circuitry.

When present, additional memory 316 may comprise any form of memory, including volatile and/or non-volatile memory, configured to store instructions and/or data that may be used by the processing circuitry 312. Examples of additional memory 316 include, but are not limited to, mass storage media (e.g., a hard disk drive, a solid-state drive), removable storage media (e.g., a Compact Disk (CD), a Digital Video Disk (DVD), a memory card).

The communication interface(s) 314 enable the core network node 310 to send messages to and receive messages from other network nodes (e.g., radio network nodes, other core network nodes, servers, etc.). In that sense, the communication interface 314 generally comprises the necessary hardware and software to process messages received from the processing circuitry 312 to be sent by the core network node 310 into a format appropriate for the underlying transport network and, conversely, to process messages received from other network nodes over the underlying transport network into a format appropriate for the processing circuitry 312. Hence, communication interface 314 may comprise appropriate hardware (e.g., port, modem, network interface card, etc.) and software, including protocol conversion and data processing capabilities, to communicate with other network nodes.

Some embodiments may be represented as a non-transitory software product stored in a machine-readable medium (also called a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions or codes which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

References in the specification to "one embodiment," "an embodiment," "an example embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a," "an," and "the" should include the plural forms, unless the context indicates otherwise. It will be further understood that the terms "comprises," "comprising," "includes," and/or "including" when used, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used should be interpreted as having a meaning that is consistent with their meaning in the context of this specification and the relevant art and will not be interpreted in an idealized or overly formal sense unless expressly so defined herein.

The above-described embodiments are examples only. Alterations, modifications and variations may be effected to the particular embodiments by those of skill in the art without departing from the scope of the description.

ABBREVIATIONS AND ACRONYMS

The present description may comprise these abbreviations and/or acronyms:
3GPP Third Generation Partnership Project
AMBR Aggregate Maximum Bit Rate
AMF Access Management Function
CN Core Network
D2D Device-to-Device
eNB evolved Node B
EPC Evolved Packet Core
E-UTRAN Evolved Universal Terrestrial Radio Access Network
gNB Next Generation Node B (a Node B supporting NR)
LTE Long Term Evolution
MME Mobility Management Entity
NB Node B
NG-RAN Next-Generation Radio Access Network
NGC Next Generation Core
Non-GBR Non-Guaranteed Bit Rate
NR New Radio
PDU Packet Data Unit
PGW Packet Data Network Gateway
RAN Radio Access Network
SGW Serving Gateway
SMF Session Management Function
UDM Unified Data Management
UE User Equipment
UPF User Plane Function

RELATED STANDARD REFERENCES

The following references may be related to the present description:
3GPP TS 23.501 V15.4.0
3GPP TS 23.502 V15.4.1
3GPP TS 38.300 V15.4.0
3GPP TS 38.401 V15.4.0
3GPP TS 38.413 V15.2.0
3GPP TS 38.473 V15.4.1

What is claimed is:

1. A method in a first network node, the method comprising:
sending a first message indicating a context setup request message to a second network node, the context setup request message not comprising a wireless device, WD, aggregate maximum bit rate, AMBR, value associated with a wireless device;
receiving, from the second network node, a second message, and upon determining, based on receiving the second message, that the first network node has not previously provided the WD AMBR value to the second network node in the context setup request message;
sending a resource setup request message to the second network node, the resource setup request message comprising the WD AMBR value associated with the wireless device.

2. The method of claim 1, wherein the first network node is a core network node and wherein the second network node is a radio network node.

3. The method of claim 2, wherein the core network node is an Access and Mobility Management Function, AMF, node, and wherein the radio network node is a Next-Generation Radio Access Network, NG-RAN, node.

4. The method of claim 3, wherein the context setup request message is an INITIAL CONTEXT SETUP REQUEST message, and/or wherein the resource setup request message is a PDU SESSION RESOURCE SETUP REQUEST message.

5. The method of claim 1, wherein the first network node is a central unit, CU, of a radio network node, and wherein the second network node is a distributed unit, DU, of a radio network node.

6. The method of claim 5, wherein the CU of the radio network node is a gNB-CU node, and wherein the DU of the radio network node is a gNB-DU node.

7. The method of claim 6, wherein the context setup request message is a UE CONTEXT SETUP REQUEST message, and/or wherein the resource setup request message is a UE CONTEXT MODIFICATION REQUEST message.

8. A first network node, the first network node comprising processing circuitry configured to:
send a first message indicating a context setup request message to a second network node, the context setup request message not comprising a wireless device, WD, aggregate maximum bit rate, AMBR, value associated with a wireless device;
receive, from the second network node, a second message, and upon determining, based on receiving the second message, that the first network node has not previously provided the WD AMBR value to the second network node in the context setup request message;
send a resource setup request message to the second network node, the resource setup request message comprising the WD AMBR value associated with the wireless device.

9. The first network node of claim 8, wherein the first network node is a core network node and wherein the second network node is a radio network node.

10. The first network node of claim 9, wherein the core network node is an Access and Mobility Management Function, AMF, node, and wherein the radio network node is a Next-Generation Radio Access Network, NG-RAN, node.

11. The first network node of claim 10, wherein the context setup request message is an INITIAL CONTEXT SETUP REQUEST message, and/or wherein the resource setup request message is a PDU SESSION RESOURCE SETUP REQUEST message.

12. The first network node of claim 8, wherein the first network node is a central unit, CU, of a radio network node, and wherein the second network node is a distributed unit, DU, of a radio network node.

13. The first network node of claim 12, wherein the CU of the radio network node is a gNB-CU node, and wherein the DU of the radio network node is a gNB-DU node.

14. The first network node of claim 13, wherein the context setup request message is a UE CONTEXT SETUP REQUEST message, and/or wherein the resource setup request message is a UE CONTEXT MODIFICATION REQUEST message.

15. A computer program product comprising a non-transitory computer-readable storage medium having computer-readable instructions embodied in the medium, wherein when the computer-readable instructions are executed by processing circuitry of a first network node, the computer-readable instructions enable the first network node to:
send a first message indicating a context setup request message to a second network node, the context setup request message not comprising a wireless device, WD, aggregate maximum bit rate, AMBR, value associated with a wireless device;
receive, from the second network node, a second message, and upon determining, based on receiving the second message, that the first network node has not previously provided the WD AMBR value to the second network node in the context setup request message;
send a resource setup request message to the second network node, the resource setup request message comprising the WD AMBR value associated with the wireless device.

16. The method of claim 1, wherein the second message indicates a User Equipment (UE) context update request message.

17. The first network node of claim 8, wherein the second message indicates a User Equipment (UE) context update request message.

* * * * *